(12) United States Patent
Foster et al.

(10) Patent No.: US 9,606,732 B2
(45) Date of Patent: Mar. 28, 2017

(54) VERIFICATION OF SERIALIZATION OF STORAGE FRAMES WITHIN AN ADDRESS SPACE VIA MULTI-THREADED PROGRAMS

(71) Applicant: International Business Machines Corporation, Armonk, NY (US)

(72) Inventors: Alfred F. Foster, Wappingers Falls, NY (US); Charles E. Mari, Wappingers Falls, NY (US); Robert Miller, Jr., Poughkeepsie, NY (US); Harris M. Morgenstern, Wappingers Falls, NY (US); Thomas F. Rankin, Tillson, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 14/289,036

(22) Filed: May 28, 2014

(65) Prior Publication Data

US 2015/0347021 A1    Dec. 3, 2015

(51) Int. Cl.
| | |
|---|---|
| G06F 11/00 | (2006.01) |
| G06F 3/06 | (2006.01) |
| G06F 11/07 | (2006.01) |

(52) U.S. Cl.
CPC .......... *G06F 3/0607* (2013.01); *G06F 3/0631* (2013.01); *G06F 3/0673* (2013.01); *G06F 11/073* (2013.01); *G06F 11/0778* (2013.01)

(58) Field of Classification Search
CPC ..... G06F 3/0607; G06F 3/0631; G06F 3/0673
See application file for complete search history.

(56) References Cited

U.S. PATENT DOCUMENTS 5,159,677 A * 10/1992 Rubsam .............. G06F 12/109
                                                            711/2
5,333,319 A *  7/1994 Silen ...................... G06F 9/52
                                                          711/203

(Continued)

FOREIGN PATENT DOCUMENTS

WO        2008006674 A1    1/2008

OTHER PUBLICATIONS

Elpida Tzortzatos zOS Basics: Virtual Storage Management (VSM) Overview 2009 IBM.*

(Continued)

*Primary Examiner* — Bryce Bonzo
*Assistant Examiner* — Katherine Lin
(74) *Attorney, Agent, or Firm* — Cantor Colburn LLP; William A. Kinnaman, Jr.

(57) ABSTRACT

A method, system, and computer program product to verify serialization of storage frames within an address space via multi-threaded programs is described. The method includes dynamically scaling a number of units of work based on a number of available processors, each of the units of work configured to execute actions, and dynamically scaling an amount and page size of virtual storage accessed by each of the units of work based on a total available memory. The method also includes obtaining, at each of the units of work, different types of storage pages and accessing storage pages corresponding with the respective different types of virtual storage pages associated with the different frame sizes and attributes and performing a respective action, and verifying, for each of the units of work performing the respective action, a state and data content of the storage pages.

20 Claims, 2 Drawing Sheets

(56) References Cited

U.S. PATENT DOCUMENTS

| | | | |
|---|---|---|---|
| 8,176,279 B2* | 5/2012 | Farrell | G06F 11/0712 |
| | | | 711/152 |
| 8,613,002 B2 | 12/2013 | Narayanan et al. | |
| 9,465,736 B2 | 10/2016 | Foster et al. | |
| 2005/0195660 A1* | 9/2005 | Kavuri | G06F 3/0605 |
| | | | 365/189.05 |
| 2006/0179429 A1* | 8/2006 | Eggers | G06F 8/458 |
| | | | 717/151 |
| 2009/0063806 A1* | 3/2009 | Logan | G06F 9/5016 |
| | | | 711/173 |
| 2009/0100243 A1 | 4/2009 | Ault et al. | |
| 2012/0290780 A1 | 11/2012 | Kinter et al. | |
| 2013/0305004 A1 | 11/2013 | Mussolff | |
| 2014/0082305 A1 | 3/2014 | Hom et al. | |
| 2014/0082313 A1 | 3/2014 | Miller, Jr. et al. | |

OTHER PUBLICATIONS

Cabrera et al., "ADSM: A Multi-Platform, Scalable, Backup and Archive Mass Storage System", IEEE, 1995, pp. 420-427.
List of IBM Patents of Patent Applications Treated as Related (U.S. Appl. No. 14/288,979); 1 page.
List of IBM Patents or Patent Applications Treated as Related; (Appendix P), Filed Nov. 15, 2016; 2 pages.

* cited by examiner

VERIFICATION OF SERIALIZATION OF STORAGE FRAMES WITHIN AN ADDRESS SPACE VIA MULTI-THREADED PROGRAMS

BACKGROUND

The present invention relates to memory management, and more specifically, to verification of serialization of storage frames within an address space via multi-threaded programs.

A computing system may process multi-threaded programs. Multi-threaded programs are multiple sequences of instructions that are scheduled independently of each other by the operating system. The threads may be scheduled for processing by one processor or multiple processors that are run in parallel. A unit of work corresponds with a task or function. While a unit of work may have a one-to-one correspondence with a thread, a unit of work may instead relate to multiple threads or multiple threads may relate to a given unit of work, because threads correspond with processor scheduling while units of work correspond with executed functions. When units of work share an address space, the operating system must serialize requests from the units of work for real storage frames (subsets of the real memory) within the same address space. An address space is a contiguous range of virtual addresses assigned by the operating system. Verification of the serialization ensures proper operation of a newly assembled or upgraded computing system.

SUMMARY

According to one embodiment of the present invention, a method of verifying serialization of storage frames within an address space in a computing system via multi-threaded programs includes dynamically scaling a number of units of work based on a number of available processors, each of the units of work configured to execute actions; dynamically scaling an amount and page size of virtual storage accessed by each of the units of work based on a total available memory; obtaining, at each of the units of work, different types of storage pages in the virtual storage associated with different frame sizes and attributes of real storage; accessing, using each of the units of work, storage pages corresponding with the respective different types of virtual storage pages associated with the different frame sizes and attributes and performing a respective action; and verifying, for each of the units of work performing the respective action, a state and data content of the storage pages based on the respective action.

According to another embodiment of the invention, a system to verify serialization of storage frames within an address space in a computing system via multi-threaded programs includes a memory device configured to store instructions for units of work and a verification program; and two or more processors configured to execute the instructions to dynamically scale the number of units of work based on a number of the two or more processors, each of the units of work configured to execute actions and dynamically scale an amount and page size of virtual storage accessed by each of the units of work based on a total available memory, wherein each of the units of work is configured to obtain different types of storage pages in the virtual storage associated with different frame sizes and attributes of real storage, and to access the storage pages corresponding with the respective different types of virtual storage pages associated with the different frame sizes and attributes and perform a respective action, and the two or more processors verify, for each of the units of work performing the respective action, a state and data content of the storage pages based on the respective action.

According to yet another embodiment of the invention, a computer program product stores instructions which, when processed by a processor, cause the processor to implement a method of verifying serialization of storage frames within an address space in a computing system via multi-threaded programs. The method includes dynamically scaling a number of units of work based on a number of available processors, each of the units of work configured to execute actions; dynamically scaling an amount and page size of virtual storage accessed by each of the units of work based on a total available memory; obtaining, at each of the units of work, different types of storage pages in the virtual storage associated with different frame sizes and attributes of real storage; accessing, using each of the units of work, storage pages corresponding with the respective different types of virtual storage pages associated with the different frame sizes and attributes and performing a respective action; and verifying, for each of the units of work performing the respective action, a state and data content of the storage pages based on the respective action.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, serialization of requests for real storage frames within the same address space must be verified to ensure proper operation of a new or upgraded operating system of a computing system. When units of work access the memory space, they read or write content to pages. A page is a unit of virtual memory and may be regarded as a finite state machine. That is, each page is associated with both a state and content written to the page. For example, a page may be in an input or output state when the page is stored in auxiliary memory and a unit of work accesses the page to read from or write to the page. As other examples, a page may be in a real storage state (content is stored in a frame) or a no data state. Embodiments of the systems and methods discussed herein relate to executing test units of work and verifying both the states and content of pages resulting from the execution.

Figure 1:
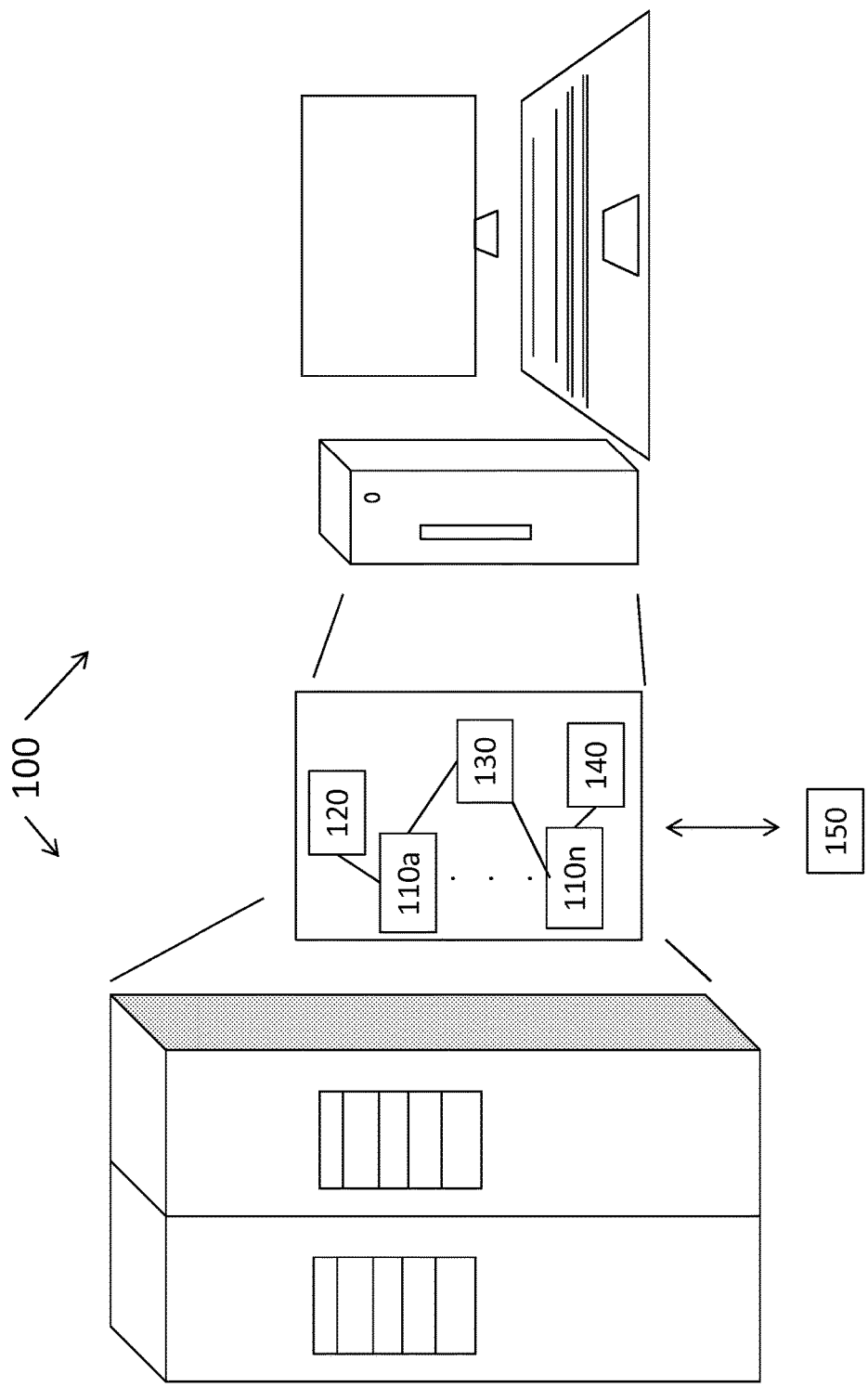
FIG. 1 illustrates exemplary computing systems that may be verified according to embodiments of the invention.

FIG. 1 illustrates exemplary computing systems 100 that may be verified according to embodiments of the invention.

The computing system 100 may be a mainframe or a desktop computer as shown in FIG. 1, for example. The computing system 100 includes two or more processors 110a through 110n (generally designated as 110), an input interface 120, one or more memory devices 130 that make up the real memory of the computing system 100, and an output interface 140. Memory management by the operating system of the computing system 100 is verified based on instructions (detailed below) that are executed by the processors 110. An external device 150 may be in communication with the computing system 100. The external device 150 includes an input port, one or more processors, one or more memory devices, and an output port. The external device 150 may play a part in instructing the computing system 100 to implement the verification process or may be used in the validation.

Figure 2:
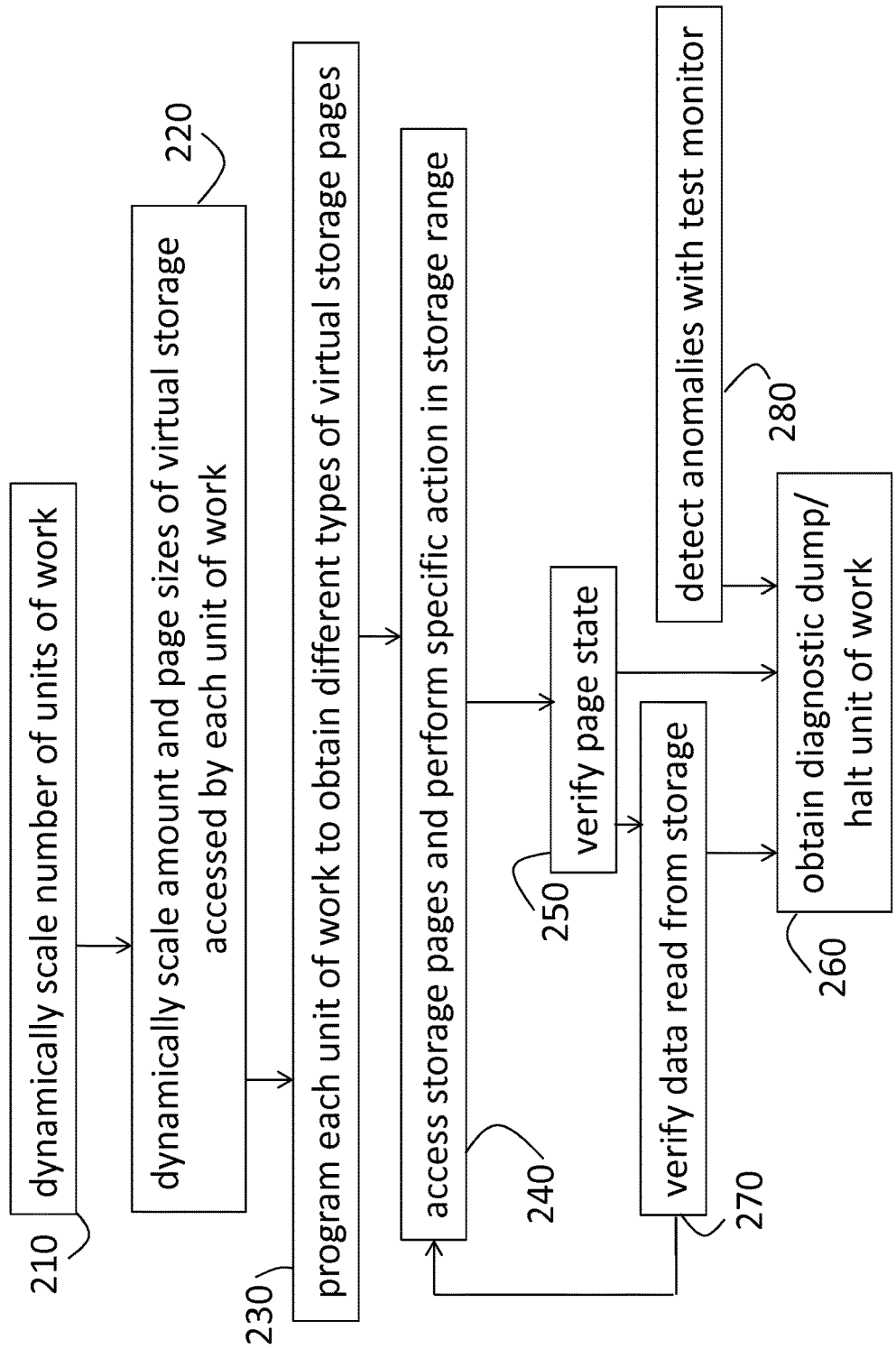
FIG. 2 is a process flow of a method of verifying serialization of storage frames within an address space via multi-threaded programs according to embodiments of the invention.

FIG. 2 is a process flow of a method of verifying serialization of storage frames within an address space via multi-threaded programs according to embodiments of the invention. The method of verifying serialization includes verifying page state and data content, as detailed below. At block 210, dynamically scaling the number of units of work includes dividing the units of work among the available processors 110. At block 220, dynamically scaling the amount and page sizes of virtual storage accessed by each unit of work is based on the total memory. That is, a sum of the total amount of real storage, total amount of direct access storage device (DASD) auxiliary storage, and total amount of storage class memory (Flash) auxiliary storage is divided by the number of units of work:

$$\frac{\text{real\_storage} + DASD + \text{Flash}}{numberofunitsofwork} \qquad [\text{EQ. 1}]$$

At block 230, programming each unit of work to obtain different types of virtual storage pages includes each unit of work obtaining private, common, and shared virtual storage pages that are backed by different frame sizes and attributes (or that correspond with real memory organized into different sizes and types). The different frame sizes and attributes include, for example, 4 kilobytes (KB) disabled reference (dref), 4 KB pageable, 1 mega byte (MB) fixed, 1 MB pageable, and 2 gigabytes (GB) fixed storage frames.

The processes at blocks 240 through 270 are implemented iteratively as indicated by FIG. 2. The iterations may be of a specific number or the processes may be repeated iteratively for the duration that the computing system is available for test. At block 240, accessing storage pages and performing a specific action in the storage range (of the accessed storage pages) with each unit of work includes accessing the storage range (memory address range within the single memory address space) used by each unit of work corresponding with the current iteration. The specific action may be selected based on an algorithm that associates the action (An) with a page (Pn) of page type (Tn) and page status (Sn) where n is the number of the processor 110. At each iteration, the units of work may be implemented simultaneously. For example, two processors 110 (implementing two units of work) may simultaneously fault on a 4 KB first reference page and a 1 MB pageable page on storage class memory in the same address space. Table 1 below illustrates the two exemplary actions.

TABLE 1

Exemplary actions taken by units of work in a given iteration.

|  | action 1: address space page reference | action 2: address space page reference |
|---|---|---|
| page type | 31 bit private 4 KB | 64 bit private 1 MB pageable on storage class memory |
| page state | first reference | |

The processors 110 may handle over 100 page actions, 24 page types, and 18 page states, for example.

At block 250, verifying the page state following performing the action against the storage area by each unit of work includes checking the expected state of the pages. The verification itself may be performed using operating system services such as internal system services. When incorrect page data, page frame size, or page frame state is detected at block 250, the process at block 260 of obtaining a diagnostic dump may be performed. The process at block 260 may also include halting the unit of work resulting in the incorrect page. When the correct page information is detected at block 250, verifying any data read from storage (data on the page in virtual memory that maps to a frame of real memory) at block 270 may be done using a unique key composed of the frame address location, a sequence number, and a stored clock time. The verification (blocks 250 and 270) following execution of test actions by the units of work facilitates deterministic validation of the operating system. At block 280, additional verification may be performed by detecting anomalies with a test monitor. The test monitor may use internal or external counts maintained by the operating system to verify that the operating system properly serializes access to different page frame sizes for multiple simultaneous (multi-threaded) requests. Based on the outcome of verifying the data at block 270 or the additional verification at block 280, obtaining a diagnostic dump and, additionally, halting of the corresponding unit of work may be done at block 260.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of verifying serialization of storage frames within an address space in a computing system via multi-threaded programs, the method comprising:
    dynamically scaling a number of units of work based on a number of available processors, each of the units of work configured to execute actions;
    dynamically scaling an amount and page size of virtual storage accessed by each of the units of work based on a total available memory;
    obtaining, at each of the units of work, different types of storage pages in the virtual storage associated with different frame sizes and attributes of real storage;
    accessing, using each of the units of work, storage pages corresponding with the respective different types of virtual storage pages associated with the different frame sizes and attributes and performing a respective action; and
    verifying, for each of the units of work performing the respective action, a state and data content of the storage pages based on the respective action.

2. The method according to claim 1, the dynamically scaling the number of units of work includes assigning each of the units of work to a respective one of the number of available processors.

3. The method according to claim 1, the dynamically scaling the amount and page sizes of virtual storage includes determining the total available memory as a sum of total amount of real storage, total amount of direct access storage device (DASD) auxiliary storage, and total amount of storage class memory (Flash) auxiliary storage.

4. The method according to claim 1, wherein the obtaining the different types of storage pages includes obtaining at least one of a private, common, or shared virtual storage page of the different frame sizes and attributes including at least one of a 4 kilobytes (KB) disabled reference (dref), a 4 KB pageable storage frame, a 1 megabyte (MB) fixed storage frame, a 1 MB pageable storage frame, and a 2 gigabyte (GB) fixed storage frame.

5. The method according to claim 1, further comprising obtaining a diagnostic dump when the verifying the state of the storage pages indicates an error for one of the units of work.

6. The method according to claim 5, further comprising halting the one of the units of work.

7. The method according to claim 1, further comprising iteratively performing the accessing the storage pages, the performing the respective action, and the verifying the state and the data content, wherein each of the units of work is implemented once for each iteration.

8. The method according to claim 1, further comprising detecting anomalies in serializing storage frames by an operating system of the computing system based on a test monitor.

9. A system to verify serialization of storage frames within an address space in a computing system via multi-threaded programs, the system comprising:
    a memory device configured to store instructions for units of work and a verification program; and
    two or more processors configured to execute the instructions to dynamically scale the number of units of work based on a number of the two or more processors, each of the units of work configured to execute actions and dynamically scale an amount and page size of virtual storage accessed by each of the units of work based on a total available memory, wherein
    each of the units of work is configured to obtain different types of storage pages in the virtual storage associated with different frame sizes and attributes of real storage, and to access the storage pages corresponding with the respective different types of virtual storage pages associated with the different frame sizes and attributes and perform a respective action, and
    the two or more processors verify, for each of the units of work performing the respective action, a state and data content of the storage pages based on the respective action.

10. The system according to claim 9, wherein the two or more processors dynamically scale the number of units of work based on assigning each of the units of work to a respective one of the two or more processors.

11. The system according to claim 9, wherein the two or more processors dynamically scale the amount and page sizes of the virtual storage based on determining the total available memory as a sum of total amount of real storage, total amount of direct access storage device (DASD) auxiliary storage, and total amount of storage class memory (Flash) auxiliary storage.

12. The system according to claim 9, wherein each of the units of work obtains at least one of a private, common, or shared virtual storage page of the different frame sizes and attributes including at least one of a 4 kilobytes (KB) disabled reference (dref), a 4 KB pageable storage frame, a 1 megabyte (MB) fixed storage frame, a 1 MB pageable storage frame, and a 2 gigabyte (GB) fixed storage frame.

13. The system according to claim 9, wherein the two or more processors are further configured to obtain a diagnostic dump and halt one of the units of work when the state of the storage pages indicates an error for the one of the units of work.

14. The system according to claim 9, wherein the units of work iteratively access the storage pages and perform the respective action.

15. The system according to claim 9, further comprising a test monitor configured to detect anomalies in serializing storage frames by an operating system of the computing system.

16. A computer program product storing instructions which, when processed by a processor, cause the processor to implement a method of verifying serialization of storage frames within an address space in a computing system via multi-threaded programs, the method comprising:
    dynamically scaling a number of units of work based on a number of available processors, each of the units of work configured to execute actions;
    dynamically scaling an amount and page size of virtual storage accessed by each of the units of work based on a total available memory;
    obtaining, at each of the units of work, different types of storage pages in the virtual storage associated with different frame sizes and attributes of real storage;

accessing, using each of the units of work, storage pages corresponding with the respective different types of virtual storage pages associated with the different frame sizes and attributes and performing a respective action; and verifying, for each of the units of work performing the respective action, a state and data content of the storage pages based on the respective action.

17. The computer program product according to claim 16, wherein the method further comprises obtaining a diagnostic dump when the verifying the state of the storage pages indicates an error for one of the units of work.

18. The computer program product according to claim 17, wherein the method further comprises halting the one of the units of work.

19. The computer program product according to claim 16, wherein the method further comprises iteratively performing the accessing the storage pages, the performing the respective action, and the verifying the state and the data content, wherein each of the units of work is implemented once for each iteration.

20. The computer program product according to claim 16, wherein the method further comprises detecting anomalies in serializing storage frames by an operating system of the computing system based on a test monitor.

* * * * *